United States Patent
Acar et al.

(10) Patent No.: US 10,790,746 B2
(45) Date of Patent: Sep. 29, 2020

(54) POWER DISSIPATION REGULATED BUCK ARCHITECTURE

(71) Applicant: Dialog Semiconductor (UK) Limited, London (GB)

(72) Inventors: Turev Acar, Istanbul (TR); Selcuk Talay, San Jose, CA (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/668,953

(22) Filed: Aug. 4, 2017

(65) Prior Publication Data
US 2019/0044445 A1     Feb. 7, 2019

(51) Int. Cl.
*H02M 3/158*     (2006.01)

(52) U.S. Cl.
CPC .................................. *H02M 3/158* (2013.01)

(58) Field of Classification Search
CPC . H02M 3/155–1588; H02M 1/08; H02M 3/07
See application file for complete search history.

(56) References Cited

U.S. PATENT DOCUMENTS

| | | | |
|---|---|---|---|
| 5,157,592 A | 10/1992 | Walters | |
| 5,307,284 A * | 4/1994 | Brunfeldt | G01R 27/28 324/76.12 |
| 5,440,913 A * | 8/1995 | Crispin | B60R 21/0173 180/282 |
| 6,215,288 B1 * | 4/2001 | Ramsey | H02M 3/1588 323/224 |
| 7,193,401 B1 * | 3/2007 | Hasegawa | H02M 3/1588 323/224 |
| 7,279,875 B2 | 10/2007 | Gan et al. | |
| 7,675,758 B2 | 3/2010 | Artusi et al. | |
| 7,791,419 B1 * | 9/2010 | Lemkin | H03L 1/027 331/47 |
| 7,930,110 B2 * | 4/2011 | Ossart | G01N 27/221 324/684 |
| 9,331,707 B1 * | 5/2016 | Blom | H03M 1/1047 |
| 9,479,054 B2 * | 10/2016 | Shiina | H02M 3/1563 |
| 9,608,521 B2 * | 3/2017 | Shiina | H02M 3/156 |
| 9,634,698 B2 * | 4/2017 | Arno | H04B 1/0475 |
| 9,774,255 B2 * | 9/2017 | Xi | H02M 3/157 |
| 9,800,149 B2 * | 10/2017 | Kawano | H02M 1/08 |

(Continued)

OTHER PUBLICATIONS

German Office Action, File Ref: 10 2017 222 038.4, Applicant: Dialog Semiconductor (UK) Limited, dated Nov. 16, 2018, 9 pages, and English language translation, 12 pages.

*Primary Examiner* — Yusef A Ahmed
(74) *Attorney, Agent, or Firm* — Saile Ackerman LLC; Stephen B. Ackerman

(57) ABSTRACT

The present disclosure provides a DC-DC switching converter architecture that utilizes the chip's thermal capacity effectively by implementing adaptive switching frequency scaling over the operation region, keeping the die/package temperature constant. The power budget is effectively utilized, and the external components such as capacitors, inductors, and pass device sizes are reduced, thereby increasing the efficiency of the switching converter. An adaptive frequency scalar is optimized, avoiding losses, especially at high loads. The larger the input and output voltage ranges, the bigger the benefit the disclosure becomes.

25 Claims, 11 Drawing Sheets

(56) References Cited

U.S. PATENT DOCUMENTS

| | | | |
|---|---|---|---|
| 2006/0015294 A1* | 1/2006 | Yetter, Jr. | G05B 23/0254 702/183 |
| 2006/0152264 A1* | 7/2006 | Pedersen | H03F 3/217 327/175 |
| 2006/0214647 A1* | 9/2006 | Ishimaru | H02M 3/1588 323/222 |
| 2007/0018628 A1* | 1/2007 | Akashi | H02M 3/1588 323/284 |
| 2008/0088292 A1* | 4/2008 | Stoichita | H02M 3/156 323/285 |
| 2008/0218133 A1* | 9/2008 | Kuan | H02M 3/156 323/234 |
| 2008/0315797 A1* | 12/2008 | Sanchez | H02P 23/0077 315/309 |
| 2009/0039926 A1* | 2/2009 | Baake | H02M 7/1557 327/105 |
| 2009/0058521 A1* | 3/2009 | Fernandez | H03F 1/32 330/149 |
| 2009/0177295 A1* | 7/2009 | Niemi | G01S 5/0018 700/42 |
| 2009/0322299 A1* | 12/2009 | Michishita | H02M 3/156 323/282 |
| 2010/0207594 A1* | 8/2010 | Davoudi | H02M 3/157 323/283 |
| 2010/0316172 A1* | 12/2010 | Keehr | H04B 1/109 375/344 |
| 2011/0181225 A1* | 7/2011 | Geyer | H02M 7/487 318/503 |
| 2012/0019218 A1* | 1/2012 | Fang | H02M 3/156 323/271 |
| 2012/0146606 A1* | 6/2012 | Li | H02M 3/156 323/283 |
| 2012/0212276 A1* | 8/2012 | Ziegler | H02M 1/4225 327/303 |
| 2012/0235664 A1* | 9/2012 | Dong | H02M 3/156 323/311 |
| 2012/0237047 A1* | 9/2012 | Neal | H04B 3/234 381/66 |
| 2012/0268088 A1* | 10/2012 | Lee | H02M 3/1588 323/271 |
| 2013/0063102 A1* | 3/2013 | Chen | H02M 3/156 323/234 |
| 2013/0076332 A1* | 3/2013 | Burgos | H02M 5/4585 323/317 |
| 2013/0194850 A1* | 8/2013 | Harrison | H02M 7/217 363/126 |
| 2014/0125302 A1* | 5/2014 | Yang | H02M 3/1563 323/282 |
| 2014/0191744 A1* | 7/2014 | Choi | H02M 3/157 323/283 |
| 2014/0210441 A1 | 7/2014 | Mao et al. | |
| 2014/0246543 A1* | 9/2014 | Andoh | B64G 1/26 244/169 |
| 2015/0028960 A1* | 1/2015 | Yorita | H03L 1/026 331/176 |
| 2015/0115914 A1* | 4/2015 | Chang | H02M 3/156 323/271 |
| 2015/0188433 A1* | 7/2015 | Jiang | H02M 3/158 323/271 |
| 2015/0263616 A1* | 9/2015 | Shiina | H02M 3/156 323/283 |
| 2015/0280557 A1* | 10/2015 | Xue | H02M 3/156 323/271 |
| 2015/0326327 A1* | 11/2015 | Carlsson | H03F 1/0222 375/224 |
| 2015/0362937 A1* | 12/2015 | Wang | H02M 3/156 323/281 |
| 2016/0036454 A1* | 2/2016 | Moehlmann | H03L 7/0994 327/147 |
| 2016/0080013 A1* | 3/2016 | Arno | H04B 1/0475 455/114.3 |
| 2016/0087528 A1* | 3/2016 | Fogg | H02M 3/156 323/271 |
| 2016/0105111 A1* | 4/2016 | Yang | H02M 3/1563 323/271 |
| 2016/0172999 A1* | 6/2016 | Fogg | H02M 3/1588 363/53 |
| 2016/0197627 A1* | 7/2016 | Qin | H03F 1/0227 375/297 |
| 2017/0070145 A1* | 3/2017 | Childs | H02M 3/158 |
| 2017/0163150 A1* | 6/2017 | Xi | H02M 3/157 |
| 2017/0201099 A1* | 7/2017 | Savanth | H02J 7/025 |
| 2017/0229958 A1* | 8/2017 | Kawano | H02M 1/08 |
| 2017/0229960 A1* | 8/2017 | Gambetta | H02M 3/158 |
| 2017/0244320 A1* | 8/2017 | Kawano | H02M 3/157 |
| 2017/0250606 A1* | 8/2017 | Kawano | H02M 3/158 |
| 2017/0257028 A1* | 9/2017 | Kawano | H02M 3/158 |
| 2017/0264853 A1* | 9/2017 | Tateishi | H02M 1/32 |
| 2017/0271986 A1* | 9/2017 | Kawano | H02M 1/08 |
| 2017/0288543 A1* | 10/2017 | Jing | H02M 1/08 |
| 2017/0302161 A1* | 10/2017 | Green | H02M 1/4208 |
| 2018/0123461 A1* | 5/2018 | Lim | H02M 3/33515 |

* cited by examiner

POWER DISSIPATION REGULATED BUCK ARCHITECTURE

BACKGROUND

Field

The disclosure relates generally to Buck, Boost, Buck-Boost and other types of DC-DC switching power converters, with adaptive switching frequency.

Description

Conventionally in DC-DC switching converters with fixed switching frequency, the power dissipation is not constant with varying input and output voltages. Generally, the package is determined based on the maximum need of the application, at a worst-case input and output voltage configuration. Although the package is designed to best utilize the power budget during most of its operation, the power budget is not effectively utilized. The external components such as output capacitor and inductor values are selected in order to satisfy worst-case condition of operation, and for other conditions, the output capacitor and inductor values are more than needed.

For conventional DC-DC switching converter designs, as input voltage or output voltage varies, power dissipation also varies. Therefore, for the package selection, it is necessary to take worst-case conditions into account. Such package selection generally is not optimal, since the power dissipation has a tendency to peak at one operation point, and has less value throughout the rest of the operating region.

SUMMARY

An object of the disclosure is to provide a DC-DC switching converter architecture that utilizes the chip's thermal capacity effectively, implementing adaptive switching frequency scaling over the operation region, keeping the die/package temperature constant.

A further object of the disclosure is to effectively utilize the power budget available through the die/package area.

Still further, another object of the disclosure is to reduce the sizes of external components such as capacitors, inductors, and pass devices, thereby increasing the efficiency of the switching converter.

To accomplish the above and other objects, a power dissipation regulated DC-DC switching converter is disclosed, comprising a high side and a low side device, a SR latch, configured to supply a non-inverting output to the gate of the high side device, and an inverting output to the gate of the low side device, comparator, configured to control an off time of the high side device, and an on time duration generator, configured to control an on time of a high side device. The power dissipation circuit, for a given input and output voltage range, has a frequency represented by a 3D surface, further represented by a third or second order polynomial relationship, configured with digital or analog circuitry.

The above and other objects are further achieved by a method for a power dissipation regulated circuit, embodying the principles of the disclosure. The steps include providing a DC-DC switching converter, with a high side and a low side pass device. The steps also include controlling the on time of the high side pass device with an on time duration generator, and controlling the off time of the high side pass device with output voltage error information. The steps also include adaptively scaling a switching frequency of said DC-DC switching converter.

In various embodiments the function may be achieved using a Buck, Boost, or Buck-Boost DC-DC switching converter.

In various embodiments the function may be achieved using a PMOS high side device.

In various embodiments the function may be achieved using a NMOS low side device.

In various embodiments, the function may be achieved with valley-mode current control.

In various embodiments, the function may be achieved with peak-mode current control.

In various embodiments, the function may be achieved with a hysteretic control system.

In various embodiments, the function may be achieved with a pseudo fixed frequency control scheme.

In various embodiments, the function may be achieved with a constant frequency control scheme.

In various embodiments, the function may be achieved with capacitance load reduction.

In various embodiments, the function may be achieved with inductance load reduction.

DETAILED DESCRIPTION

The present disclosure provides a DC-DC switching converter architecture that utilizes the chip's thermal capacity effectively by implementing adaptive switching frequency scaling over the operation region, keeping the die/package temperature constant. The power budget is effectively utilized, and the external components such as capacitors, inductors, and pass device sizes are reduced, thereby increasing the efficiency of the switching converter.

An adaptive frequency scalar is optimized, avoiding losses, especially at high loads. The larger the input and output voltage ranges, the bigger the benefit the disclosure provides. Another improvement through this architecture is that it provides flexibility for the design. For example, by keeping a particular package and power budget, the values of the output capacitance and inductance can be optimized.

Figure 1:
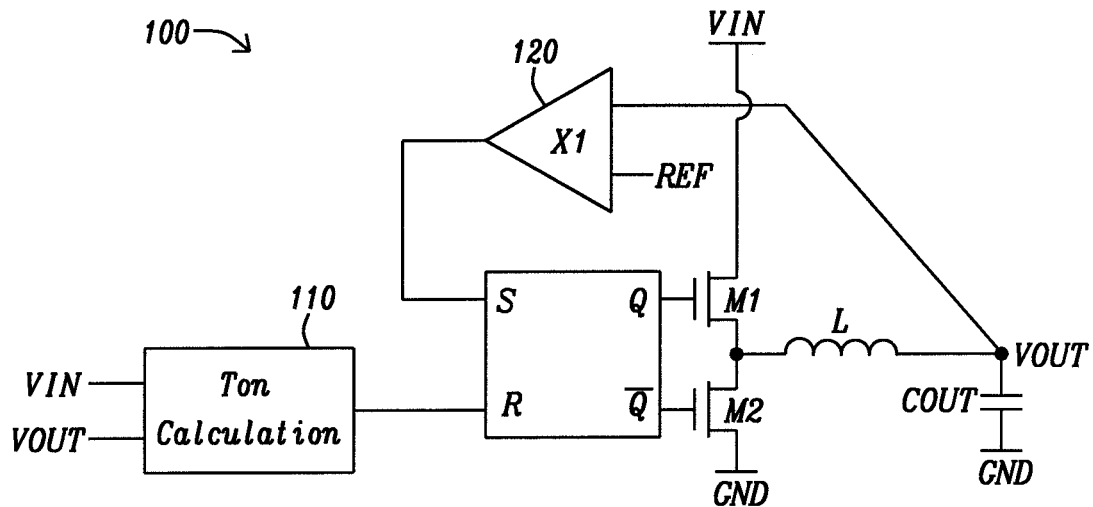
FIG. 1 illustrates a system level description of a DC-DC switching converter architecture that regulates the power dissipation and improves the operating performance, embodying the principles of the disclosure.

FIG. 1 illustrates a system level description of a DC-DC switching converter circuit that regulates the power dissipation and improves the operating performance, embodying the principles of the disclosure. The on time of high side pass device M1 is controlled by on time duration generator Ton Calculation 110, with input voltage VIN and output voltage VOUT, as inputs. Comparator 120 receives VOUT and REF as inputs, and determines the off time of M1, based on output voltage error information. The output of Ton Calculation 110 supplies input R of SR latch 130, and the output of amplifier X1 120 supplies input S of SR latch 130. High side device M1 has its source at input voltage VIN, its gate at output Q of SR latch 130, and its drain at the drain of low side device M2. Low side device M2 has its gate at output Q not of SR latch 130, and its source at ground. Capacitance COUT is across VOUT and ground, and inductance L is across VOUT and the gates of M1 and M2. Note that the switching converter architecture of the disclosure does not require any oscillator, or any other clock generator, for the time base decision of high side device M1 on time, as it is generated by Ton Calculation 110. In a typical switching converter, M1 is a PMOS device and M2 is an NMOS device, though in some circumstances M1 could be NMOS and M2 PMOS.

The switching frequency is adjusted based on Ton Calculation, where Ton is the on time duration of the M1 switch. The off time of the M1 switch, also the on time of the M2 switch, can be any of the following 1) clock based 2) hysteretic 3) error based 4) valley control and other types. The switching frequency adjustment is done in order to keep the package thermal dissipation flat, with respect to the input and output voltages. Ton Calculation allows for this adjustment.

The present disclosure provides great advantages regarding the pass device sizes of M1 and M2. If a given design includes external components of capacitance and inductance that do not need further size improvements, the utilization of the power budget may provide improvements to the pass devices. With the desired objectives achieved, the power dissipation utilization flattens the peak dissipation for the duty-cycle over different frequencies, and the package size can be further optimized.

Figure 2:
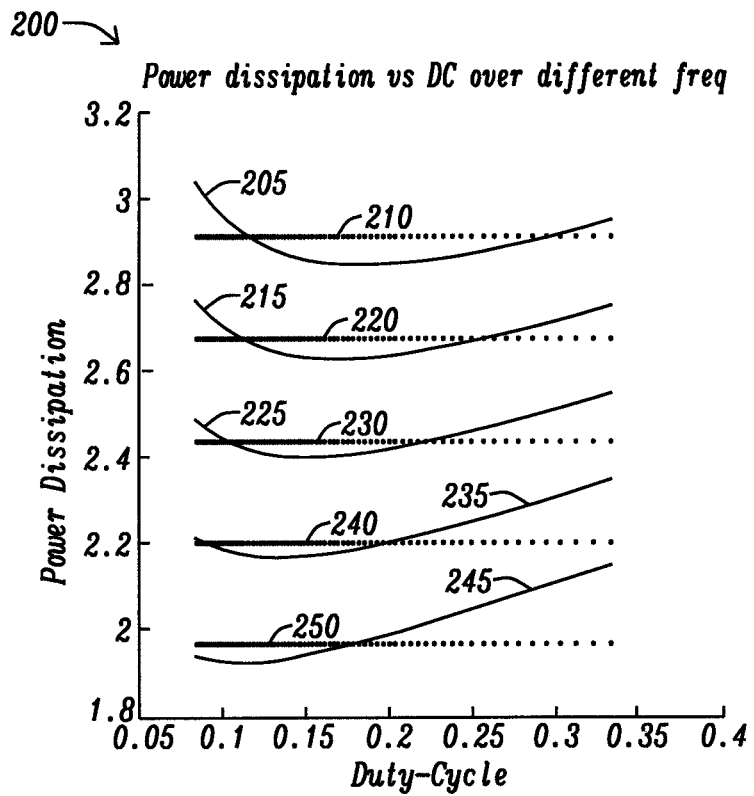
FIG. 2 shows the power dissipation capability of the package vs duty-cycle for different initial frequencies, as the package size is reduced for conventional designs, compared to the design of the disclosure.

FIG. 2 shows the power dissipation capability of the package vs duty-cycle for different initial frequencies, as the package size is reduced for conventional designs, compared to the design of the disclosure. The conventional designs are shown with the initial frequencies in parentheses for the following—205 (3MHz), 215 (2.5MHz), 225 (2MHz), 235 (1.5MHz), and 245 (1MHz), and the disclosure designs in 210 (3MHz), 220 (2.5MHz), 230 (2MHz), 240 (1.5MHz), and 250 (1MHz), for VIN from 3V to 12V, and VOUT 1V. It can be seen that the power dissipation flattens with the switching converter designs of the disclosure, compared to conventional designs. In FIG. 2, the size of the external components of capacitance and inductance are maintained, and the pass device sizes can be sized accordingly.

Figure 3A:
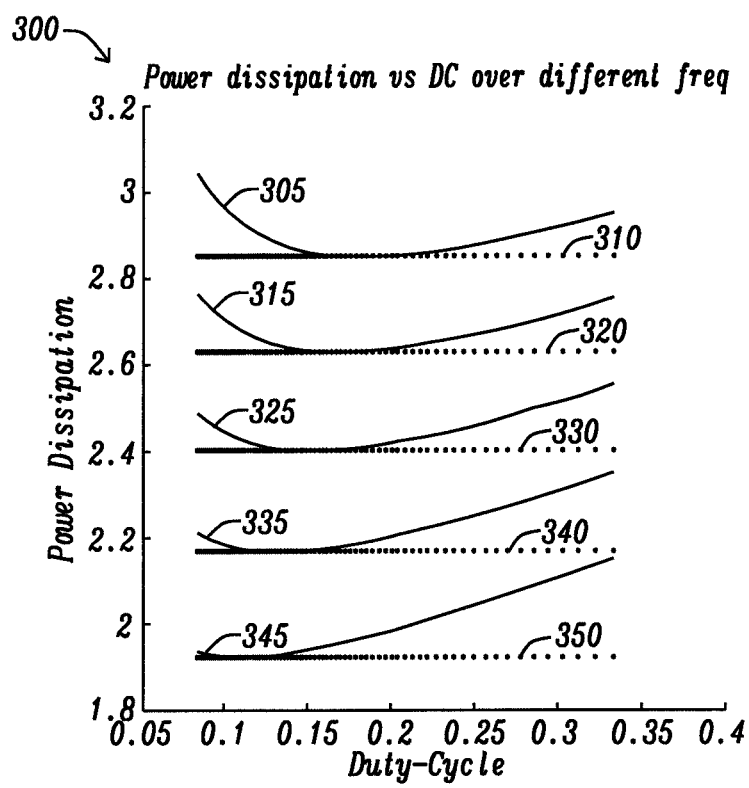
FIG. 3a shows the power dissipation capability of the package vs duty-cycle for different initial frequencies, as pass device size is optimized to the smallest package.

FIG. 3a shows the power dissipation capability of the package vs duty-cycle for different initial frequencies, as pass device size is optimized for the smallest package. In this configuration, higher external component values of capacitance and inductance are required, over conventional designs. The conventional designs are shown with the initial frequencies in parentheses for the following—305 (3MHz), 315 (2.5MHz), 325 (2MHz), 335 (1.5MHz), and 345 (1MHz), and the disclosure designs in 310 (3MHz), 320 (2.5MHz), 330 (2MHz), 340 (1.5MHz), and 350 (1MHz), for VIN from 3V to 12V, and VOUT 1V. This may be advantageous for product designs where the package is more important than the external components.

Figure 3B:
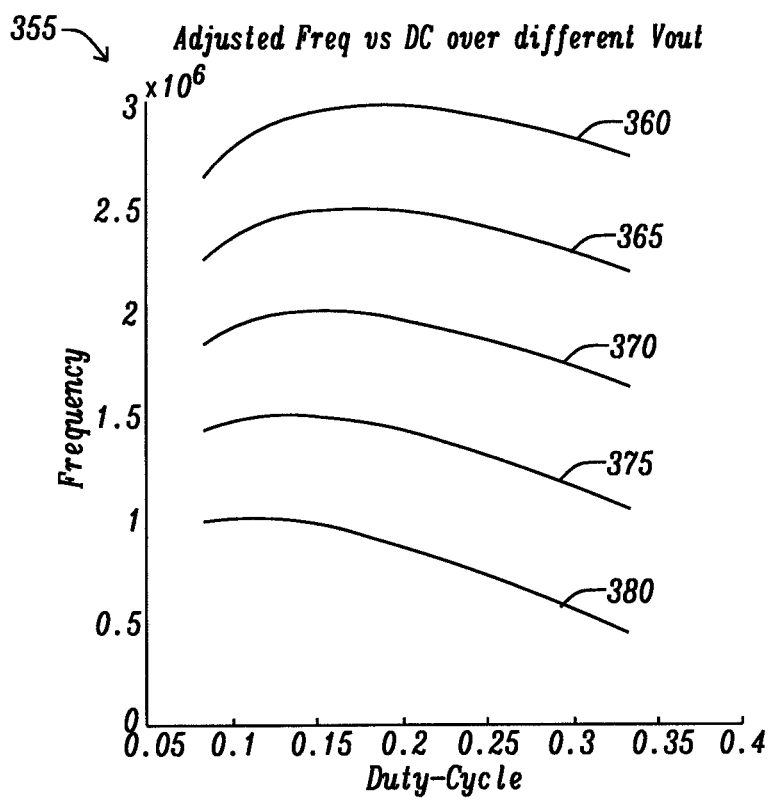
FIG. 3b shows the adjusted frequency vs duty-cycle for different output voltages, as pass device size is optimized for the smallest package, embodying the principles of the disclosure.

FIG. 3b shows the adjusted frequency vs duty-cycle for different output voltages, as pass device size is optimized for the smallest package, embodying the principles of the disclosure. The related frequencies of FIG. 3a are shown for disclosure designs of 360 (3MHz), 365 (2.5MHz), 370 (2MHz), 375 (1.5MHz), and 380 (1MHz), for VIN from 3V to 12V, and VOUT 1V. The maximum frequency is lower, and not higher, than the initial targeted frequency, and it can be seen that the frequencies are lower for the smaller package.

For conventional DC-DC switching converter designs, as the input voltage or output voltage changes, the power dissipation varies. Therefore when selecting the package, worst-case operating conditions need to be taken into account. Such selection generally is not optimal, since the power dissipation has a tendency to peak at one operating point, having less value throughout the rest of the operating region.

Figure 4:
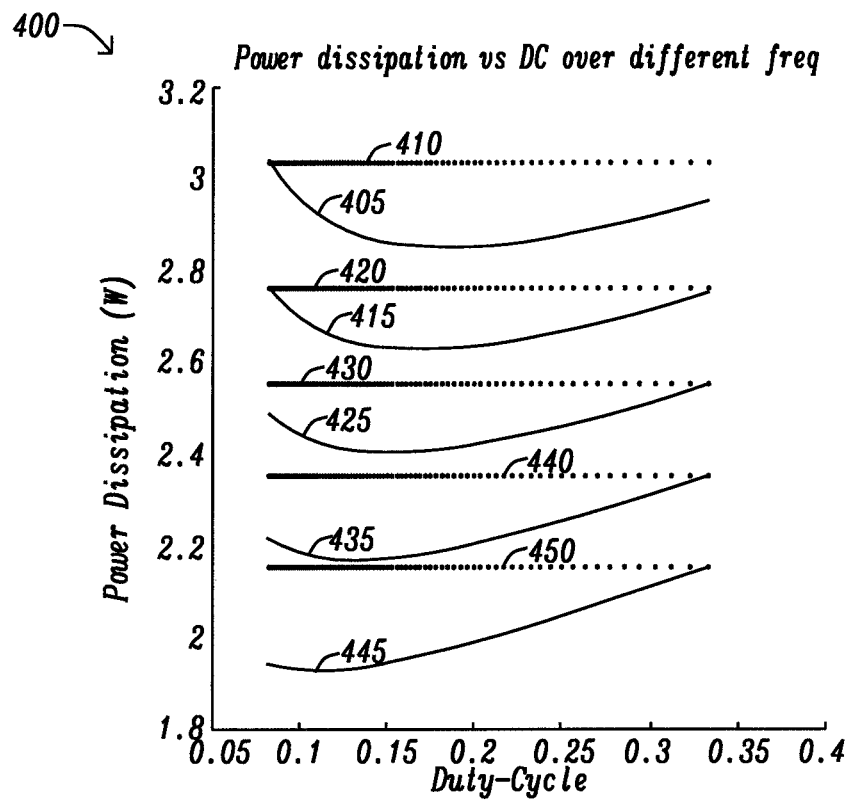
FIG. 4 shows the power dissipation capability of the package vs duty-cycle for different frequencies, and a worst case package design, for conventional designs, compared to the design of the disclosure.

FIG. 4 shows the power dissipation capability of the package vs duty-cycle for different frequencies, and a worst case package, for conventional designs, compared to the design of the disclosure. The conventional designs are shown with the initial frequencies in parentheses for the following—405 (3MHz), 415 (2.5MHz), 425 (2MHz), 435 (1.5MHz), and 445 (1MHz), and the disclosure designs in 410 (3MHz), 420 (2.5MHz), 430 (2MHz), 440 (1.5MHz), and 450 (1MHz), for VIN from 3V to 12V, and VOUT 1V. In all cases, the inductance is 1 µH, and the driver's strengths of the pass devices are the same.

Depending on the input voltage and frequency, the peak dissipation occurs at a lower or higher duty-cycle, in conventional designs. In the present disclosure, when the on time of the high side pass device is controlled by the on time duration generator, it can be seen that the power capability of the package is better utilized with an adaptive on time. The maximum power dissipation of the disclosure remains constant, as the duty-cycle increases, hence the package does not have to be designed for worst case operating conditions.

Figure 5:
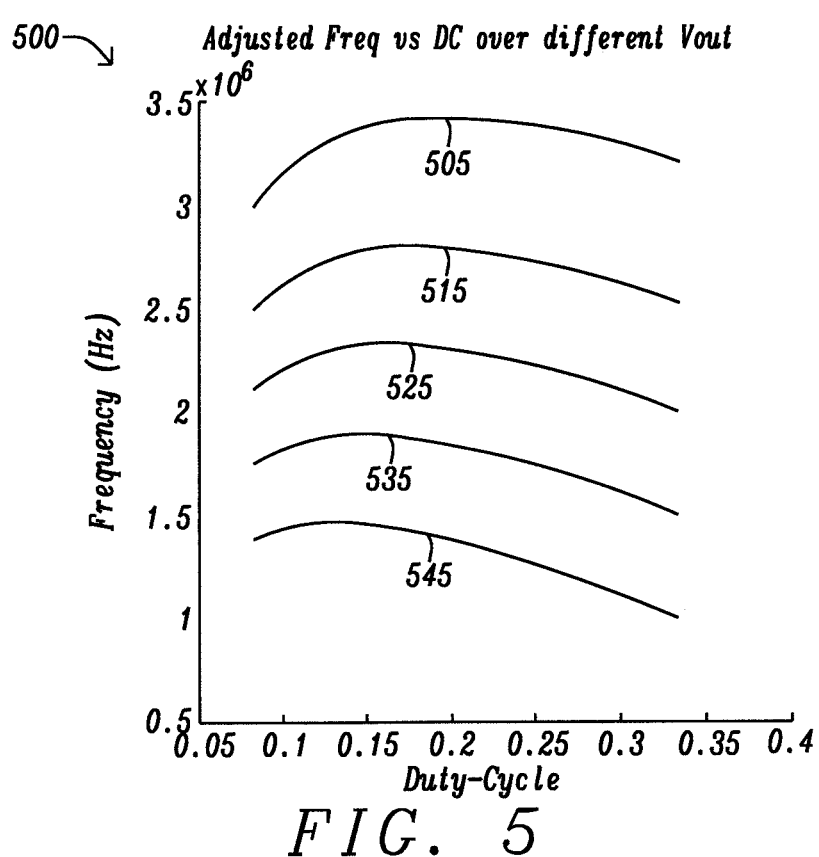
FIG. 5 illustrates adjusted frequency vs duty-cycle for different initial fixed frequencies of the proposed topology.

FIG. 5 illustrates adjusted frequency vs duty-cycle for different initial fixed frequencies of the proposed topology. In order to have flat power dissipation over the operating region of the switching converter, the switching frequency of the disclosure is designed as shown with the initial frequencies in parentheses for the following—505 (3MHz), 515 (2.5MHz), 525 (2MHz), 535 (1.5MHz), and 545 (1MHz), and VIN from 3V to 12V, with VOUT 1V. The minimum value of each curve represents the fixed frequency-switching clock, where the maximum power is dissipated. For example, 505 is derived from a 3 MHz fixed frequency-switching clock, and all frequency values shown are higher than 3 MHz, as expected. It can also be seen that the highest power dissipation occurs at 10% duty cycle, for a 3MHz fixed frequency-switching clock.

Figure 6:
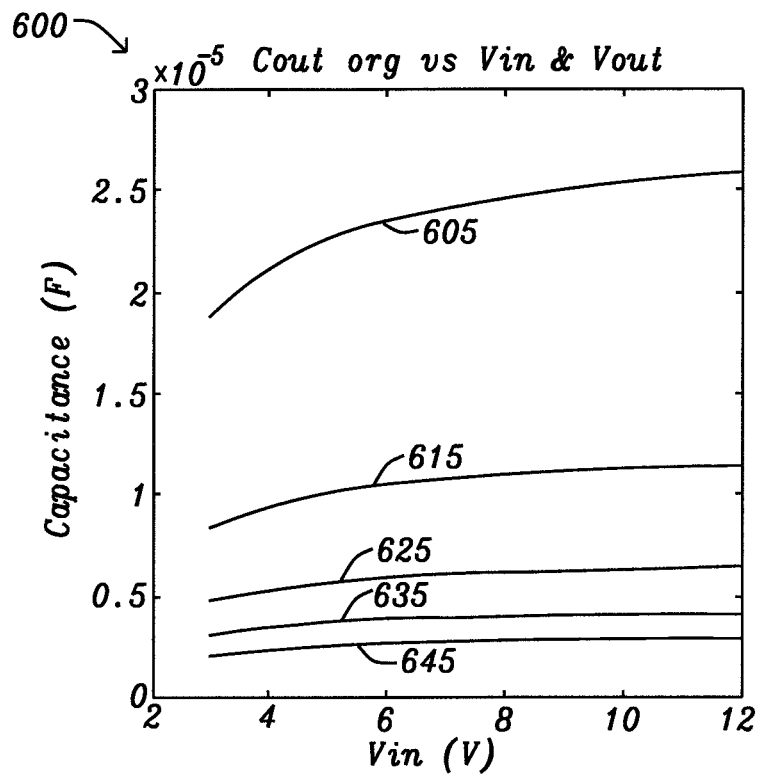
FIG. 6 shows the external required capacitance vs input voltage for different initial frequencies, of the prior art.
Figure 7:
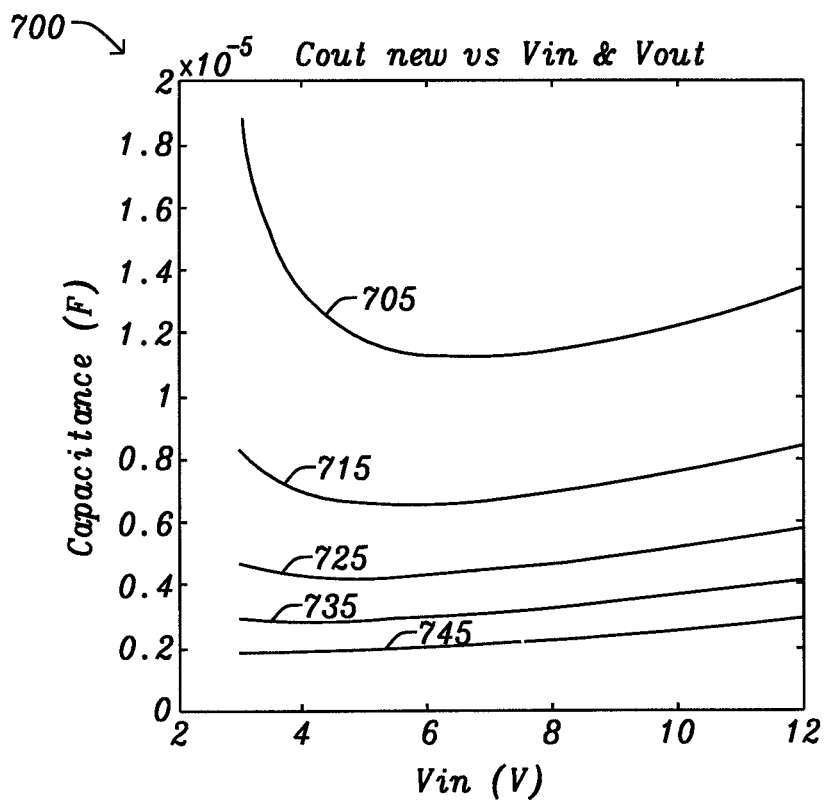
FIG. 7 shows the external required capacitance vs input voltage for different initial frequencies, embodying the principles of the disclosure.

By controlling the on time of the high side pass device of the switching converter, the present disclosure can scale the operating frequency, thereby increasing the power dissipation capability of the package. This results in lower current ripple on the output, and lower capacitance load values. FIG. 6 and FIG. 7 show output capacitance COUT obtained from a 1% output voltage ripple spec, such as for battery chargers, where output capacitance does not limit the load transient spec.

FIG. 6 shows the external required capacitance vs input voltage for different initial frequencies, of the prior art. In order to cover the full operating region, the maximum value of the external required capacitance is selected larger than 25 uF. The switching frequency of the prior art is shown with the initial frequencies in parentheses for the following—605 (1MHz), 615 (1.5MHz), 625 (2MHz), 635 (2.5MHz), and 645 (3MHz), and VIN from 3V to 12V, with VOUT 1V.

FIG. 7 shows the external required capacitance vs input voltage for different initial frequencies, embodying the principles of the disclosure. The values of capacitance are calculated, and as current ripple on the output is optimized over duty-cycle, the maximum value of the external required capacitance is reduced. The saving on the output capacitance is observed close to 25%, for 705 (1MHz), 715 (1.5MHz), 725 (2MHz), 735 (2.5MHz), and 745 (3MHz), and VIN from 3V to 12V, with VOUT 1V. It can be seen that the gain is less as the targeted frequency increases, from 705 to 745. However, considering the recent trends and future designs, applications can be expected to work in the region where the disclosure is most beneficial. For systems where the input voltage is higher, the disclosure brings the most gain considering the reduction in size of the external required capacitance.

The previous section details the disclosure for a specific output voltage, VOUT 1V. The following section cover the features mentioned above for varying output voltage, VOUT from 1V to 2V.

Figure 8:
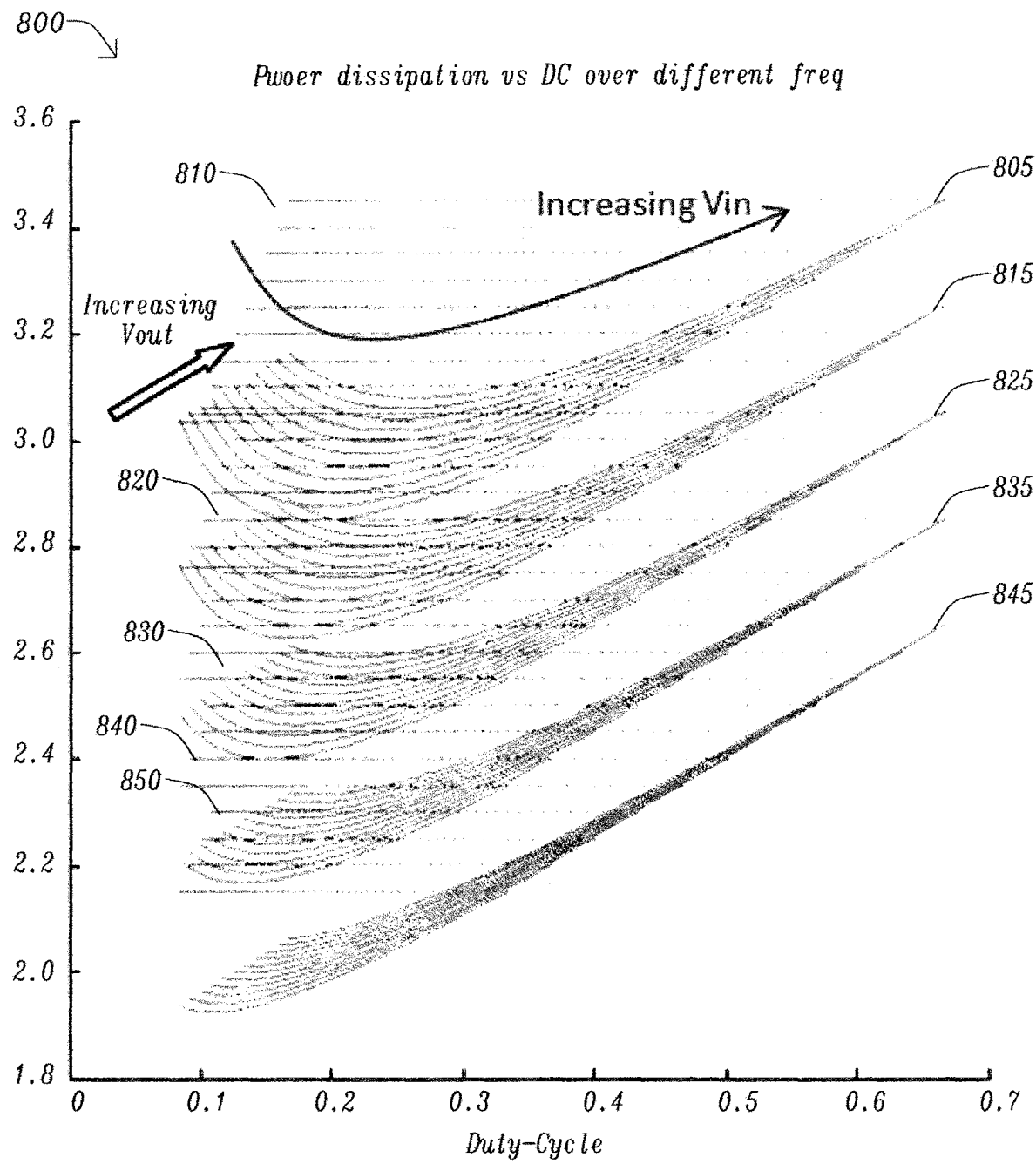
FIG. 8 illustrates the power dissipation capability of the package vs duty-cycle for different frequencies and output voltages, optimized for the smallest output capacitance, embodying the principles of the disclosure.

FIG. 8 illustrates the power dissipation capability of the package vs duty-cycle for different frequencies and output voltages, optimized for the smallest output capacitance. This is shown in comparison to FIG. 4, for conventional designs with the initial frequencies in parentheses for the following—805 (3MHz), 815 (2.5MHz), 825 (2MHz), 835 (1.5MHz), and 845 (1MHz), and disclosure designs of 810 (3MHz), 820 (2.5MHz), 830 (2MHz), 840 (1.5MHz), and 850 (1MHz), where VIN varies from 3V to 12V, and VOUT from 1V to 2V. Again, it can be seen that the power dissipation flattens with the switching converter designs of the disclosure, compared to conventional designs. Depending on the output voltage setting, the maximum power dissipation may happen at lower or higher duty-cycles.

Figure 9:
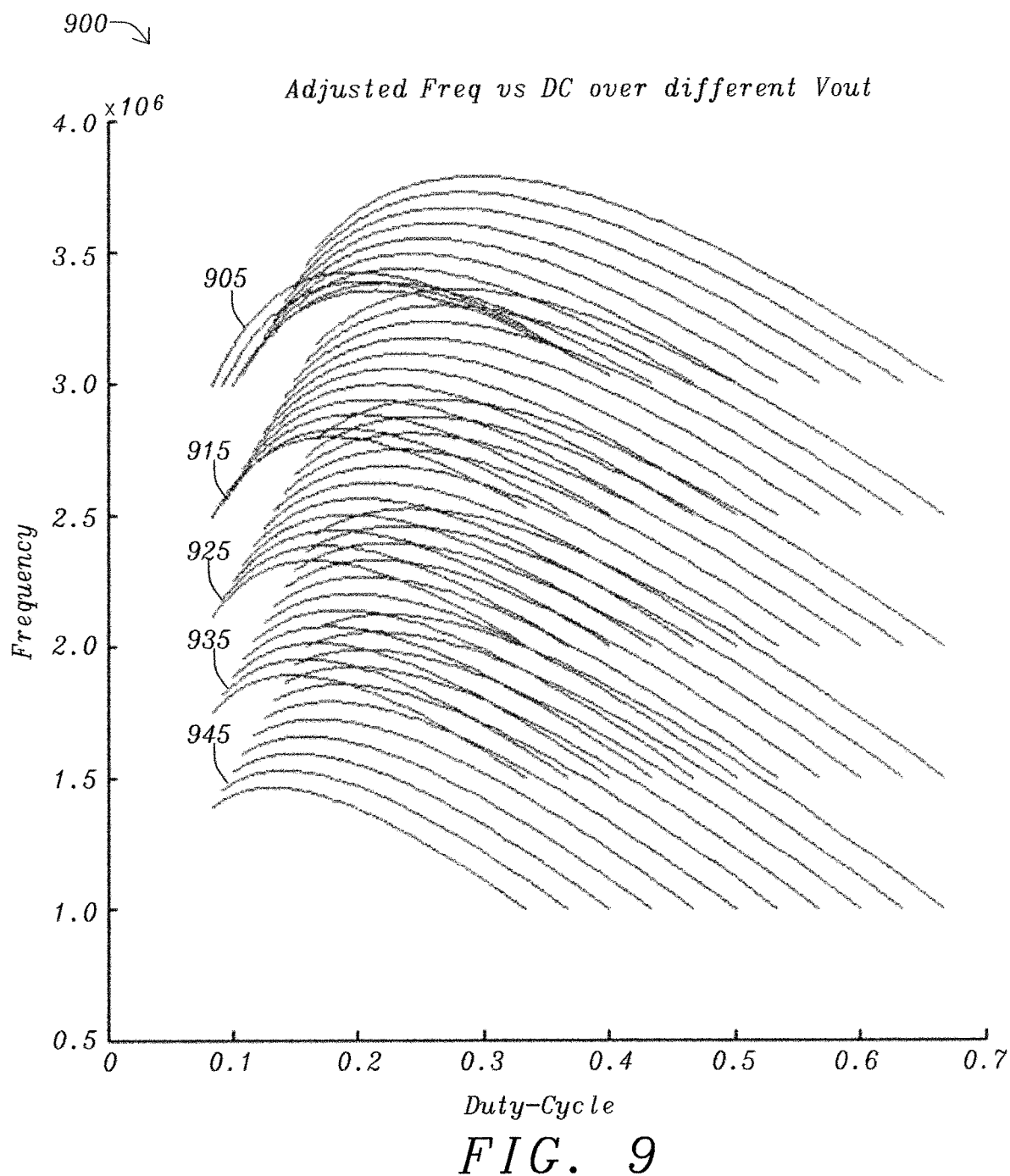
FIG. 9 shows the adjusted frequency vs duty-cycle for different initial frequencies and output voltages, optimized for smallest output capacitance, embodying the principles of the disclosure.

FIG. 9 shows the adjusted frequency vs duty-cycle for different initial frequencies and output voltages, optimized for smallest output capacitance of the disclosure. This is shown in comparison to FIG. 5, for designs with the initial frequencies in parentheses for the following—905 (3MHz), 915 (2.5MHz), 925 (2MHz), 935 (1.5MHz), and 945 (1MHz), where VIN varies from 3V to 12V, and VOUT from 1V to 2V. The minimum value of each curve represents the fixed frequency-switching clock, where the maximum power is dissipated. As maximum power dissipation is selected for a particular package, the frequency can be adjusted to the maximum value. As previously described, this provides the smallest required external capacitance value, flattening the power dissipation over the operating region of the switching converter.

Figure 10:
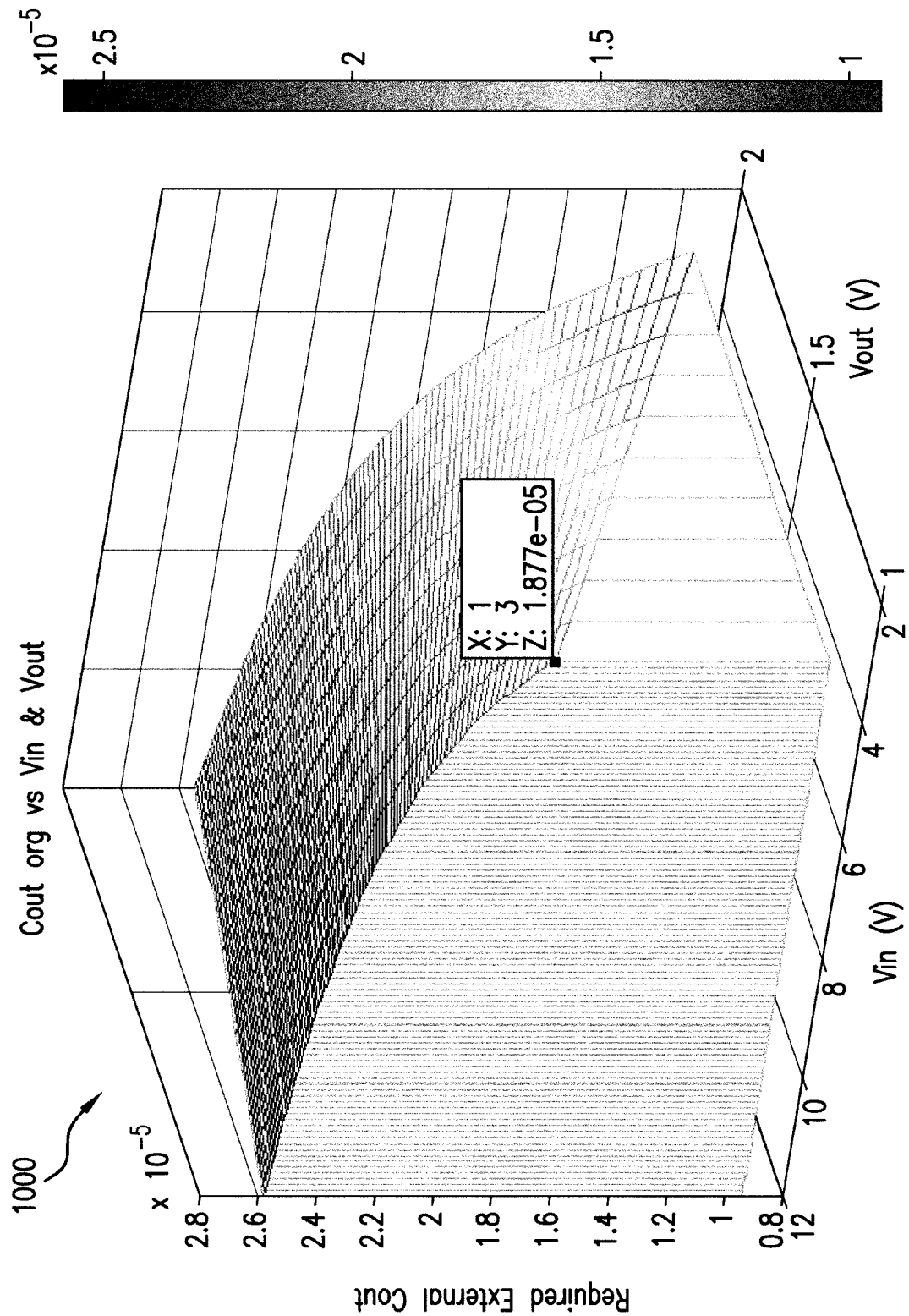
FIG. 10 is the external required capacitance vs input and output voltage, for 3MHz initial frequency in conventional designs, of the prior art.

FIG. 10 is the external required capacitance vs input and output voltage, for 3MHz initial frequency in conventional designs, of the prior art. This is shown in comparison to FIG. 6, for a design of 645 (3MHz). It can be seen that over the operating region, the maximum output capacitance, 21.9uF, is the point where the input voltage is the highest and the output voltage is the lowest. This differs from the capacitance value required with the design of the disclosure, in FIG. 11, where the maximum output capacitance is the point where both the input voltage and the output voltage is the lowest.

Figure 11:
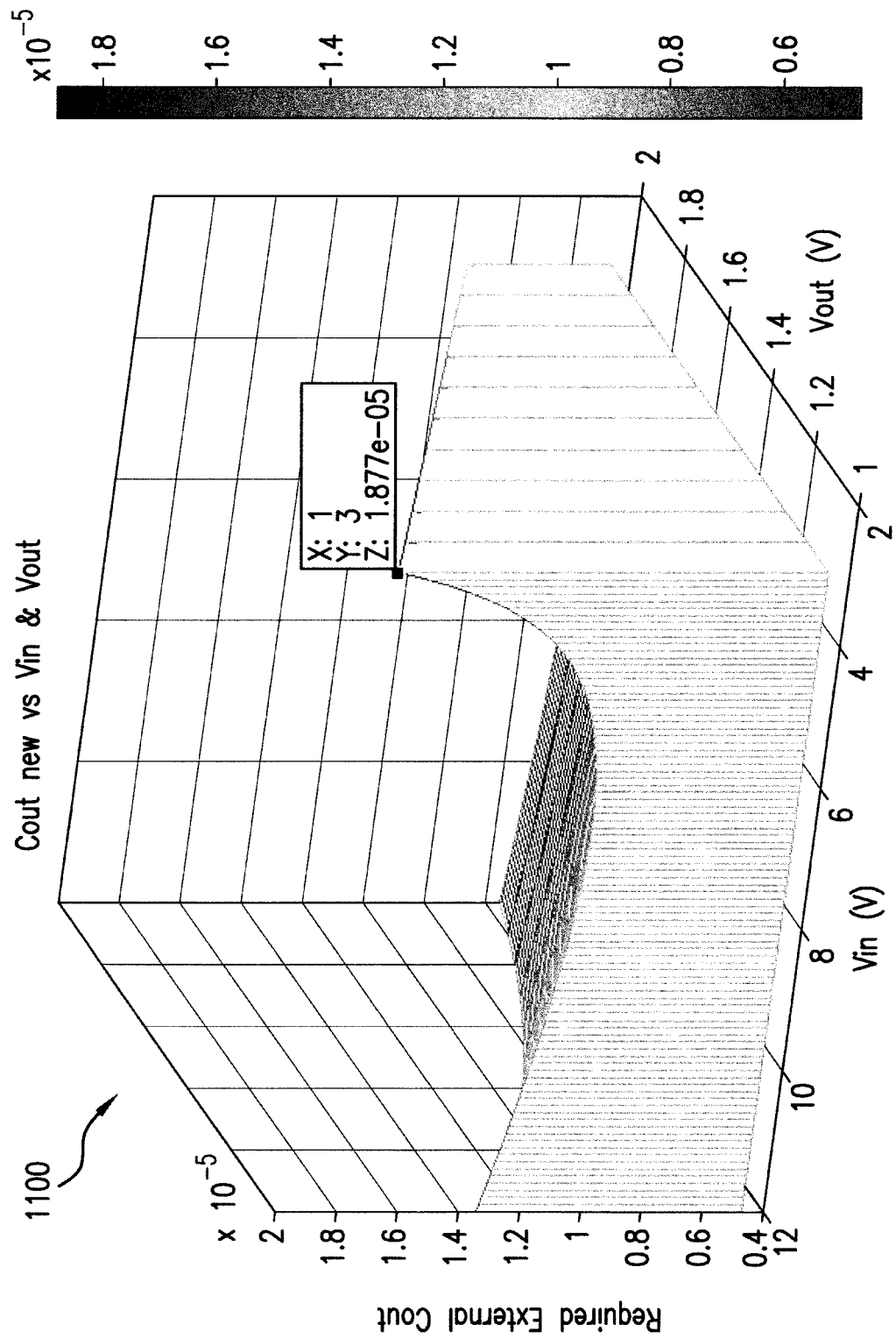
FIG. 11 shows the external required capacitance vs input and output voltage, for 3MHz initial frequency of the proposed topology.

FIG. 11 shows the external required capacitance vs input and output voltage, for 3MHz initial frequency in the proposed topology. This is shown in comparison to FIG. 7, for a design of 745 (3MHz). It can be seen that over the operating region, the maximum output capacitance, 21.9uF, is the point where the input voltage, as well as the output voltage, is the lowest.

Note that the present disclosure targets to optimize the power dissipation capability of the package, especially considering thermal capacity, by implementing adaptive switching frequency scaling over the operation region. Hence in the previous graphs the calculations were performed under high load condition. Low load conditions have not been considered, since the high load conditions are worse from a thermal capacity standpoint.

One of the important components of the disclosure is how switching frequency can be adjusted, described as Ton Calculation 110 in FIG. 1. Since the relationship between frequency and input voltage, output voltage is known, the frequency can be adjusted accurately in an open-loop control scheme. For a required output capacitance, and a given input and output voltage range, the optimum frequency can be represented by a 3D surface. The disclosure proposes that this surface can be represented by a polynomial that calculates frequency with operation conditions VIN and VOUT. Hence a simple circuitry, implemented in digital or analog, is enough to implement the adjustment of the frequency. In digital circuitry, the polynomial coefficients can be truncated to an acceptable accuracy, and implemented with logic or look-up table (LUT) based circuitry. It is also possible to implement the relationship in analog circuitry. Research supporting the disclosure shows that a third order polynomial relationship is sufficient for perfectly covering the desired 3D surface. Although a third order relationship seems to be complex to implement, there are designs especially in current-mode signal processing, for implementing such processing. A second order relationship, which can be implemented by very simple analog circuitry, is also sufficient for a given range of duty-cycle.

Figure 12:
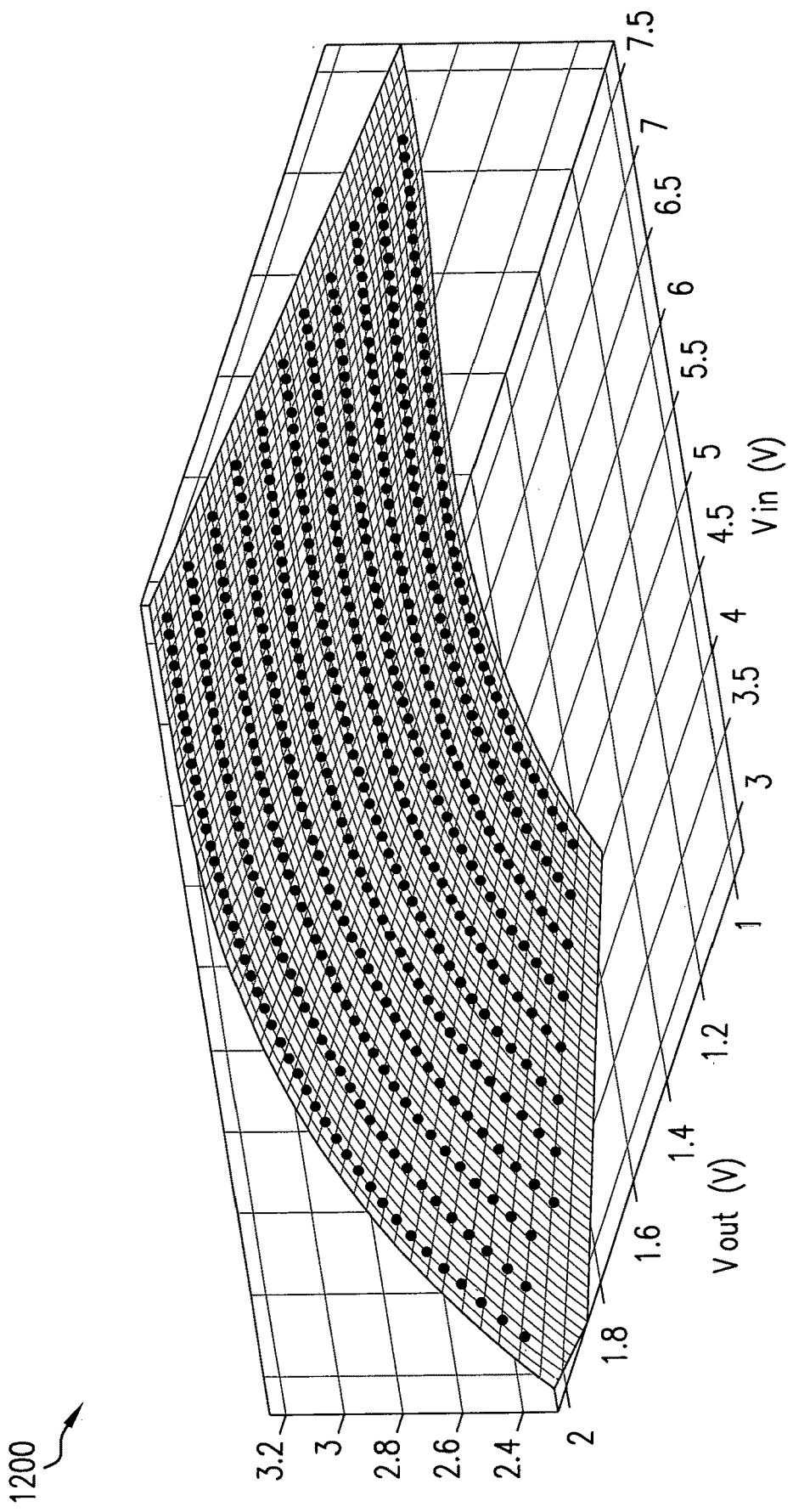
FIG. 12 illustrates frequency adjustment for a range of input and output voltages, for 3MHz initial frequency, in a third order relation of the proposed topology.

FIG. 12 illustrates frequency adjustment, for a range of input and output voltages, for 3MHz initial frequency, in a third order relation of the proposed topology. An example of the desired 3D surface can be seen, where the surface represents the frequency for a given range of input voltage VIN and output voltage VOUT. The points represent the third order relation that would be implemented in Ton Calculation 110.

The relation for this given case is as follows:

$$f(x,y)=p00+p10*x+p01*y+p20*x^2+p11*x*y+p30*x^3+p21*x^2*y$$

where coefficients with 95% confidence bounds are:
p00=2.388e+06 (2.329e+06, 2.447e+06)
p10=6.695e+05 (6.397e+05, 6.994e+05)
p01=−1.64e+06 (−1.669e+06, −1.61e+06)
p20=−1.604e+05 (−1.654e+05, −1.553e+05)
p11=5.028e+05 (4.911e+05, 5.144e+05)
p30=1.045e+04 (1.015e+04, 1.075e+04)
p21=−3.423e+04 (−3.534e+04, −3.313e+04)

FIG. 12 illustrates where the root mean square, representing the error between the actual surface and the marked points, is very close to 1.

Figure 13:
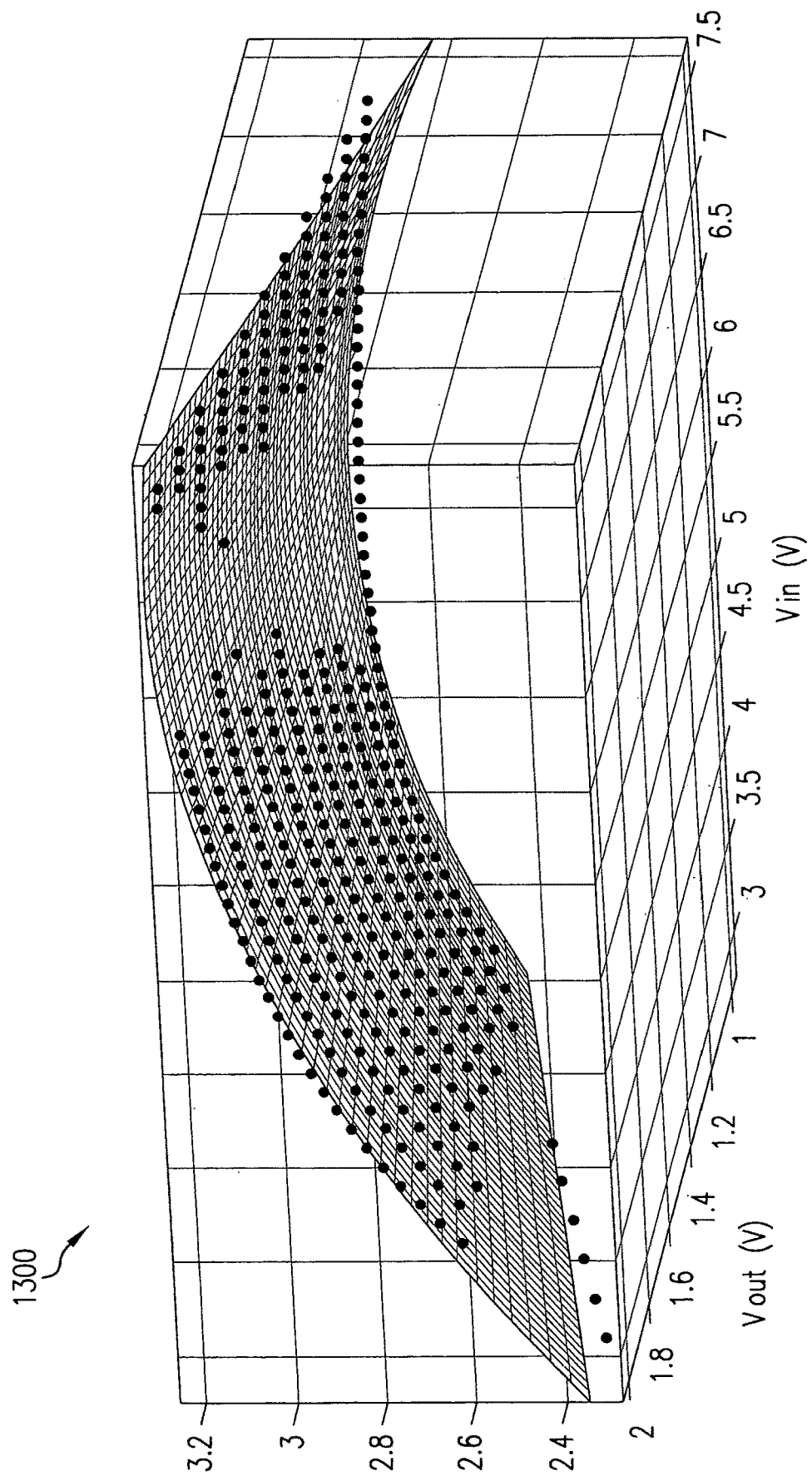
FIG. 13 shows frequency adjustment for a range of input and output voltages, for 3MHz initial frequency, in a second order relation of the proposed topology.

FIG. 13 shows frequency adjustment, for a range of input and output voltages, for 3MHz initial frequency, in a second order relation of the proposed topology. A similar 3D surface can be seen, where the surface represents the frequency for a given range of input voltage VIN and output voltage VOUT, for a second order relation. The second order relation can be implemented in analog circuitry, using fewer transistors, and it is desirable from an implementation point of view. With a limited range of duty-cycle, the operation region can be better defined, and better accuracy from the Ton Calculation 110 of FIG. 1 can be achieved.

The relation for the second order relation is given as follows:

$$f(x,y)=p00+p10*x+p01*y+p20*x^2+p11*x*y$$

where coefficients with 95% confidence bounds are:
p00=2.401e+06 (2.342e+06, 2.461e+06)
p10=3.779e+05 (3.603e+05, 3.955e+05)
p01=−7.566e+05 (−7.865e+05, −7.267e+05)
p20=−4.716e+04 (−4.863e+04, −4.569e+04)
p11=1.433e+05 (1.378e+05, 1.488e+05)

FIG. 13 illustrates where the output voltage VOUT relation is almost linear, and if the input voltage VIN increases, VOUT increases accordingly. With VIN having a limited range for higher voltages, linear circuits can implement the circuitry very easily and in a compact way.

The present disclosure covers external inductance reduction in a similar way as described for external capacitance reduction. Therefore, the disclosure is considered for all external elements covering output inductance and capacitance. In addition, the disclosure provides a 30% to 50% component size reduction, and covers all DC-DC switching converter structures, including Buck, Boost, or Buck-Boost types. The disclosure is applicable to any pseudo fixed frequency control scheme, as well as constant frequency, where the frequency can be controlled considering the input voltage and the output voltage. In various embodiments, the function may be achieved with valley-mode current control, peak-mode current control, or a hysteretic control system.

Figure 14:
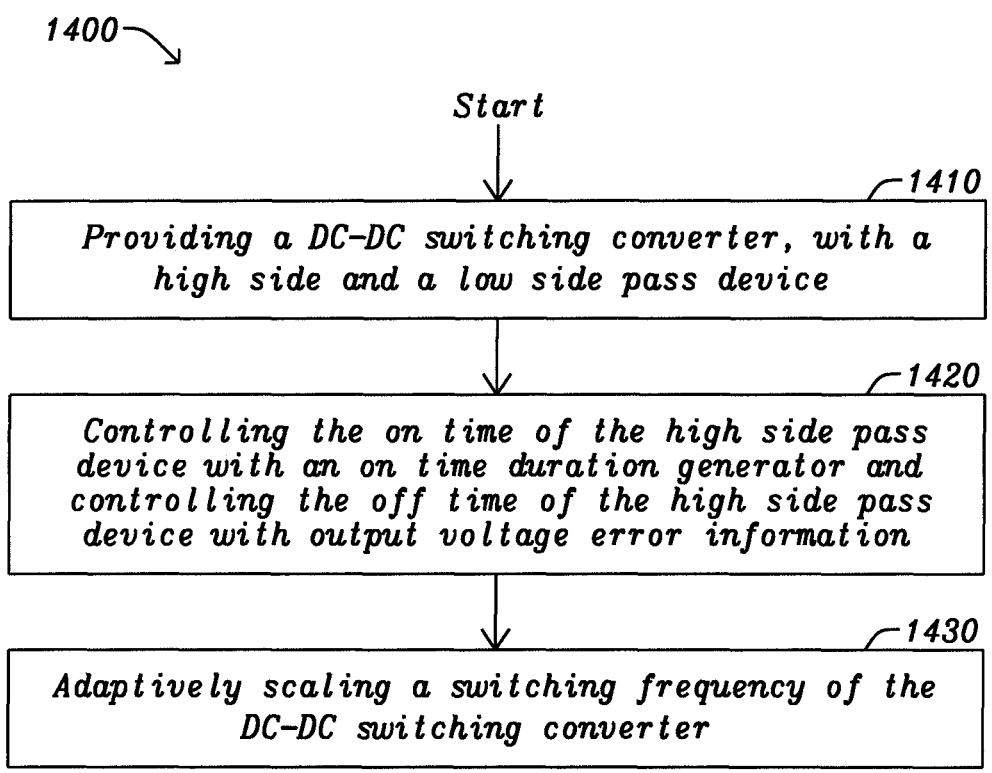
FIG. 14 is a flow chart of a method for power dissipation regulated architecture, in a DC-DC switching converter, embodying the principles of the disclosure.

FIG. 14 is a flow chart of a method for a power dissipation regulated circuit, embodying the principles of the disclosure. The steps include 1410, providing a DC-DC switching converter, with a high side and a low side pass device. The steps also include 1420, controlling the on time of the high side pass device with an on time duration generator, and controlling the off time of the high side pass device with output voltage error information. The steps also include 1430, adaptively scaling a switching frequency of said DC-DC switching converter.

The advantages of one or more embodiments of the present disclosure include maximum power utilization over the full operation region of the DC-DC switching converter. With adaptive switching frequency scaling, the switching converter is improved, expanding the design space and possible design dimensions. The disclosure allows utilization of the chip's power dissipation bandwidth to gain from package and power related design element sizes. The required output pass devices, capacitors, and inductors may be made smaller, leading to a savings in the component and board area itself. The switching converter architecture is achieved with minimum cost and improved performance values. The larger the input and output voltage ranges, the larger the benefit of the disclosure.

While this invention has been particularly shown and described with reference to the preferred embodiments thereof, it will be understood by those skilled in the art that various changes in form and details may be made without departing from the spirit and scope of the invention.

The invention claimed is:

1. A power dissipation circuit, comprising:
a high side device and a low side device, configured for a DC-DC switching converter;
a SR latch, configured to supply a non-inverting output to a gate of said high side device, and an inverting output to a gate of said low side device;
a comparator, configured to control an off time of said high side device, with output voltage error information; and
an on time duration generator, configured to control an on time of said high side device, by adaptively scaling a switching frequency of said DC-DC switching converter, wherein said switching frequency is calculated by a polynomial that calculates said switching frequency as determined by said on time duration generator with operation conditions of input and output voltages of said DC-DC switching converter;
wherein for a given input and output voltage range, said switching frequency as determined by said on time duration generator is represented by a 3D surface;
wherein a third order polynomial that calculates said switching frequency is configured to adjust said switching frequency; and
wherein polynomial coefficients of said third order polynomial that calculates said switching frequency are truncated, and implemented with logic or look-up table (LUT) based circuitry.

2. The power dissipation circuit of claim 1, wherein said on time duration generator comprises inputs from said input and output voltages of said DC-DC switching converter.

3. The power dissipation circuit of claim 1, wherein said on time duration generator comprises an output to said SR latch.

4. The power dissipation circuit of claim 1, wherein said comparator comprises inputs from said output voltage of said DC-DC switching converter and a reference voltage.

5. The power dissipation circuit of claim 1, wherein said comparator comprises an output to said SR latch.

6. The power dissipation circuit of claim 1, wherein said high side device has its source configured at said input voltage of said DC-DC switching converter, and its drain at the drain of said low side device.

7. The power dissipation circuit of claim 1, wherein said low side device has its source at ground.

8. The power dissipation circuit of claim 1, wherein said third order polynomial that calculates said switching frequency is configured to adjust said switching frequency with digital circuitry.

9. The power dissipation circuit of claim 1, wherein said third order polynomial that calculates said switching frequency is configured to adjust said switching frequency with analog circuitry.

10. The power dissipation circuit of claim 1, wherein said third order polynomial that calculates said switching frequency is configured to adjust said switching frequency with current-mode signal processing.

11. The power dissipation circuit of claim 1, wherein a second order polynomial that calculates said frequency is configured to adjust said switching frequency with analog circuitry.

12. The power dissipation circuit of claim 1, wherein said DC-DC switching converter is a Buck, Boost, or Buck-Boost DC-DC switching converter.

13. The power dissipation circuit of claim 1, wherein said high side device is a PMOS device.

14. The power dissipation circuit of claim 1, wherein said low side device is an NMOS device.

15. The power dissipation circuit of claim 1, wherein said DC-DC switching converter utilizes a valley-mode current control system.

16. The power dissipation circuit of claim 1, wherein said DC-DC switching converter utilizes a peak-mode current control system.

17. The power dissipation circuit of claim 1, wherein said DC-DC switching converter utilizes a hysteretic control system.

18. The power dissipation circuit of claim 1, wherein said on time duration generator is configured to adjust said switching frequency of said DC-DC switching converter in an open-loop control scheme.

19. The power dissipation circuit of claim 18, wherein said open-loop control scheme is a pseudo fixed frequency control scheme.

20. The power dissipation circuit of claim 18, wherein said open-loop control scheme is a constant frequency control scheme.

21. A method for a power dissipation circuit, in a DC-DC switching converter, comprising the steps of:
providing a DC-DC switching converter, with a high side pass device and a low side pass device; controlling an on time of said high side pass device with an on time duration generator by adaptively scaling a switching frequency of said DC-DC switching converter, wherein said switching frequency is calculated by a polynomial that calculates said switching frequency as determined by said on time duration generator, and controlling an off time of said high side pass device with output voltage error information;
wherein for a given input and output voltage range, a 3D surface represents said switching frequency as determined by said on time duration generator;
wherein a third order polynomial that calculates said switching frequency adjusts said switching frequency; and
wherein polynomial coefficients of said third order polynomial that calculates said switching frequency truncate, and implement with logic or look-up table (LUT) based circuitry.

22. The method of claim 21, wherein said third order polynomial that calculates said switching frequency adjusts said switching frequency with digital circuitry.

23. The method of claim 21, wherein said third order polynomial that calculates said switching frequency adjusts said switching frequency with analog circuitry.

24. The method of claim 21, wherein said third order polynomial that calculates said switching frequency adjusts said switching frequency with current-mode signal processing.

25. The method of claim 21, wherein a second order polynomial that calculates said switching frequency adjusts said switching frequency with analog circuitry.

* * * * *